United States Patent
Proebstle et al.

(10) Patent No.: US 8,076,794 B2
(45) Date of Patent: Dec. 13, 2011

(54) MULTI-VOLTAGE VEHICLE ELECTRICAL SUPPLY SYSTEM FOR A MOTOR VEHICLE AND METHOD FOR OPERATING THE SAME

(75) Inventors: Hartmut Proebstle, Augsburg (DE); Michael Roesler, Pullach (DE); Joerg Merwerth, Dachau (DE); Thomas Christ, Auburn Hills, MI (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 238 days.

(21) Appl. No.: 12/126,417

(22) Filed: May 23, 2008

(65) Prior Publication Data

US 2008/0284246 A1 Nov. 20, 2008

Related U.S. Application Data

(63) Continuation of application No. PCT/EP2006/010400, filed on Oct. 30, 2006.

(30) Foreign Application Priority Data

Nov. 25, 2005 (DE) .......................... 10 2005 056 232

(51) Int. Cl.
*B60L 1/00* (2006.01)
*B60L 3/00* (2006.01)
*H02G 3/00* (2006.01)

(52) U.S. Cl. .......... 307/9.1; 307/10.1; 307/77; 307/130; 320/104

(58) Field of Classification Search .................. None
See application file for complete search history.

(56) References Cited

U.S. PATENT DOCUMENTS

| | | | |
|---|---|---|---|
| 3,348,117 A * | 10/1967 | Howden | 320/122 |
| 4,044,293 A | 8/1977 | Follmer | |
| 4,153,869 A | 5/1979 | Ragaly | |
| 4,404,502 A * | 9/1983 | Magori et al. | 318/116 |
| 4,459,532 A * | 7/1984 | Schutten et al. | 318/781 |
| 4,748,395 A | 5/1988 | Reynolds | |

(Continued)

FOREIGN PATENT DOCUMENTS

DE 26 50 851 A1 5/1978

(Continued)

OTHER PUBLICATIONS

English translation of WO 02/066293 to Bolz, Aug. 29, 2002.*

(Continued)

*Primary Examiner* — Rexford Barnie
*Assistant Examiner* — Justen Fauth
(74) *Attorney, Agent, or Firm* — Crowell & Moring LLP

(57) ABSTRACT

A multi-voltage vehicle electrical system for a motor vehicle is provided, including at least one multi-voltage generator, a first energy store, whose energy may be fed into a first low-voltage vehicle electrical system branch having low-voltage consumers, and a second energy store, whose energy may be fed into a second high-voltage vehicle electrical system branch having high-voltage consumers, as well as at least one controllable switching device, using which the energy generated by the multi-voltage generator may be distributed to the first and the second vehicle electrical system branches, the first and the second energy stores being connected in series to one another and the first vehicle electrical system branch being connected to a node between the first and the second energy store and to a reference potential of the first energy store.

13 Claims, 1 Drawing Sheet

U.S. PATENT DOCUMENTS

| | | | | |
|---|---|---|---|---|
| 5,796,175 A | * | 8/1998 | Itoh et al. | 307/10.1 |
| 5,798,577 A | * | 8/1998 | Lesesky et al. | 307/10.7 |
| 5,978,237 A | * | 11/1999 | Savage | 307/9.1 |
| 6,011,384 A | * | 1/2000 | Chen | 323/273 |
| 6,384,489 B1 | * | 5/2002 | Bluemel et al. | 307/10.1 |
| 6,653,745 B1 | | 11/2003 | Masaki et al. | |
| 6,919,648 B2 | | 7/2005 | Bolz et al. | |
| 2001/0052760 A1 | | 12/2001 | Amano et al. | |
| 2003/0127912 A1 | * | 7/2003 | Mackel et al. | 307/10.1 |
| 2003/0155814 A1 | * | 8/2003 | Gronbach | 307/130 |
| 2006/0164033 A1 | * | 7/2006 | Bolz et al. | 320/104 |

FOREIGN PATENT DOCUMENTS

| | | |
|---|---|---|
| DE | 197 24 356 C1 | 5/1998 |
| DE | 100 57 259 A1 | 5/2002 |
| DE | 102 00 466 A1 | 7/2003 |
| DE | 103 30 703 A1 | 1/2005 |
| EP | 1 360 090 B1 | 11/2003 |
| EP | 1 523 083 A1 | 4/2005 |
| GB | 1 585 915 | 3/1981 |
| WO | WO 02/066293 A1 | 8/2002 |

OTHER PUBLICATIONS

International Search Report dated Feb. 6, 2007 with English translation (Six (6) pages).

German Search Report dated May 9, 2006 with English translation of the relevant portions (Ten (10) pages).

English translation of Form PCT/IB/338 (one (1) page); Form PCT/IB/373 (one (1) page); and Form PCT/ISA/237 (eight (8) pages) totaling (ten (10) pages), Jul. 2008.

* cited by examiner

MULTI-VOLTAGE VEHICLE ELECTRICAL SUPPLY SYSTEM FOR A MOTOR VEHICLE AND METHOD FOR OPERATING THE SAME

CROSS REFERENCE TO RELATED APPLICATIONS

This application is a continuation of PCT International Application No. PCT/EP2006/010400, filed Oct. 30, 2006, which claims priority under 35 U.S.C. §119 to German Patent Application No. 10 2005 056 232.9, filed Nov. 25, 2005, the entire disclosures of which are herein expressly incorporated by reference.

BACKGROUND AND SUMMARY OF THE INVENTION

The present invention relates to a multi-voltage vehicle electrical system for a motor vehicle, including at least one multi-voltage generator, a first energy store, whose energy may be fed into a first low-voltage vehicle electrical system branch having low-voltage consumers, and a second energy store, whose energy may be fed into a second high-voltage vehicle electrical system branch having high-voltage consumers, and at least one controllable switching device, using which the energy generated by the multi-voltage generator may be distributed to the first and second vehicle electrical system branches.

A multi-voltage vehicle electrical system for a motor vehicle of this type is known from German patent document DE 103 30 703 A1. Multi-voltage vehicle electrical systems, as are used in manifold forms in modern motor vehicles, typically include two vehicle electrical system branches of different rated voltages. Consumers of lower power consumption are connected to the low-voltage vehicle electrical system branch, whose rated voltage may be 12 V, for example. High-power consumers, such as heaters, electrical power steering, electric-motor brakes, etc., are connected to the high-voltage vehicle electrical system branch, whose rated voltage may be 24 V, for example. Each vehicle electrical system branch has an energy store assigned thereto. The use of batteries as energy stores in both vehicle electrical system branches and also the use of a battery as the energy store of the low-voltage vehicle electrical system branch and a capacitor circuit of high capacitance as the energy store of the high-voltage vehicle electrical system branch are known. Both vehicle electrical system branches are typically fed by a multi-voltage generator, which may be implemented as an integrated starting generator, for example. The term "multi-voltage generator" is understood in the scope of the present application as any generator whose output voltage level varies or is variable chronologically.

In the known multi-voltage vehicle electrical systems, and also in the multi-voltage vehicle electrical system disclosed in above-mentioned DE 103 30 703 A1, the rectified generator output voltage is fed directly into the high-voltage vehicle electrical system branch. This is connected via a DC/DC converter to the low-voltage vehicle electrical system branch. The DC/DC converter not only provides a transformer device for adapting the various voltage levels in the individual vehicle electrical system branches, but rather also allows, through suitable activation of its switchable elements, a distribution of the energy generated by the generator to the two vehicle electrical system branches as a function of operating parameters. For example, the charge state of the energy stores and/or the instantaneous load of the individual vehicle electrical system branches by connected consumers come into consideration as relevant operating parameters. A comparable construction is shown by the vehicle electrical system disclosed in European patent EP 136 00 90 B1, which is additionally also suitable for recuperation operation.

The known vehicle electrical system topologies have the disadvantage of the requirement for the DC/DC converter as a transformer and switching element. Specifically, converters of this type are comparatively costly and complicated in construction and activation. In addition, they represent a significant performance limitation, which reduces efficiency very strongly in particular in recuperation operation, in which very large amounts of power are fed into the vehicle electrical system in a short time by reclaiming energy during braking procedures.

It is therefore an object of the present invention to provide a novel, simplified topology for a multi-voltage vehicle electrical system for a motor vehicle, which manages without a DC/DC converter and nonetheless has a high compatibility to existing low-voltage vehicle electrical system topologies.

It is a further object of the present invention to provide an operating method for an improved vehicle electrical system of this type.

The first object is achieved in connection with a multi-voltage-vehicle electrical system in which the first and the second energy stores are connected in series to one another and the first vehicle electrical system branch is connected on one hand to a node between the first and the second energy store and on the other hand to a reference potential of the first energy store, while the second vehicle electrical system branch is connected in parallel to the series circuit made of first and second energy stores. The controllable switching device is switchable between a first switching configuration, in which the multi-voltage generator is in parallel to the first energy store and to the first vehicle electrical system branch, and a second configuration, in which the multi-voltage generator is in parallel to the series circuit made of first and second energy stores and to the second vehicle electrical system branch.

In contrast to the prior art, the vehicle electrical system according to the invention couples its two branches directly, in that the energy stores are connected to one another in series. It is also possible through the use of a suitable switching device to keep both vehicle electrical system branches decoupled in the "view" of their consumers, so that known and proven vehicle electrical system branch topologies, in particular proven low-voltage vehicle electrical system topologies, may be adopted.

The low-voltage vehicle electrical system branch is thus connected at a node between the two energy stores and is therefore connected in parallel to the first energy store, with which it has a shared reference potential. The second energy store, in contrast, takes the upper potential of the first energy store as the reference potential, i.e., starts at the voltage level of the low-voltage vehicle electrical system branch. The high-voltage consumers of the high-voltage vehicle electrical system branch are in parallel to the series circuit made of first and second energy stores and therefore "see" the sum of the voltage level of both energy stores.

Both energy stores and thus both vehicle electrical system branches are fed by the same generator via suitable switching device. The switching device is designed in such a manner that the generator output voltage is applied either only via the first energy store or via the series circuit of both energy stores, care having to be taken in the first case that no current flows from the second energy store to the first energy store. In addition to the desired removal of the DC/DC converter, the vehicle electrical system topology according to the invention has the advantage that the second energy store must only have a comparatively low-voltage level. While its maximum voltage level in vehicle electrical systems according to the prior art must essentially correspond to the rated voltage of the high-voltage vehicle electrical system branch, it is sufficient in the vehicle electrical system according to the invention if the maximum voltage level of the second energy store approximately corresponds to the difference of the rated voltages of the two vehicle electrical system branches.

The controllable switching device may include a first switchable interrupter between the connection nodes of the first vehicle electrical system branch and the terminal of the multi-voltage generator facing away from its reference potential. This corresponds to a switch in the direct connection line between the output of the generator and the pole of the first energy store, which is not at ground and is typically positive in vehicle electrical systems.

In a first, especially simple embodiment of the invention, the controllable switching device also includes a diode, which is connected between the terminals of the multi-voltage generator and the second energy store facing away from their particular reference potentials in such a manner that when the first interrupter is closed, no current may flow from the second energy store to the first energy store. In other words, this means that the output of the generator is also connected to the positive pole of the second energy store, via a diode which is situated after the branch to the first interrupter. The diode is oriented in such a manner that when the first interrupter is opened, the generator output voltage is applied via the series circuit made of first and second energy stores, i.e., both energy stores are charged, while if the first interrupter is closed, only the first energy store is charged and a current flow from the second energy store to the first energy store would occur in the blocking direction of the diode and is thus suppressed.

In an alternative embodiment of the invention, instead of the diode, a second switchable interrupter may be provided, which is connected between the terminals of the multi-voltage generator and the second energy store facing away from their particular reference potentials in such a manner that when the first interrupter is closed, a current flow from the second energy store to the first energy store may be prevented by opening the second interrupter. It is obvious that in this embodiment, the two interrupters must be activated suitably to suppress the desired current flow. This disadvantage of increased complexity of the activation is compensated for, however, by the advantage that the voltage drop via the diode is dispensed with.

A comparatively "large" battery is suitable as the first energy store, which must typically bear the main load of supplying the consumers. A—preferably "smaller"—battery may also be used for the second energy store; alternatively, however, a capacitor circuit made of one or more capacitors of high capacitance, so-called super capacitors or supercaps, may also be used.

The above-mentioned second object is achieved by a method according to the present invention.

For efficient and cost-effective operation of a vehicle electrical system of this type, it is favorable to switch the controllable switching unit essentially no-load. This means that in both above-mentioned embodiments, i.e., both in the embodiment having diode and also having second interrupter (which are jointly included by the term "at least unidirectional disconnection unit"), in accordance with the operating method according to the invention, before the first interrupter is closed, the generator output voltage is equalized to the potential of the terminal of the first energy store facing away from its reference potential. In other words, this means that if only the first energy store is to be charged, i.e., typically the output of the generator is to be connected to its positive pole, first the current potential at this pole is detected and the output voltage of the generator is equalized to this potential. Correspondingly, closing the first interrupter does not result in a current flow, i.e., it is switched in a no-load manner. Subsequently, the output voltage of the generator may be moved to a desired charge level. Appropriate sensors may be provided for detecting the potentials of the energy stores.

In the previously explained embodiment having two interrupters, the second interrupter is opened before the equalization of the generator output voltage in a favorable refinement of the method according to the invention. This prevents current from flowing from the second energy store to the first energy store upon closing of the second interrupter.

If the second energy store is also to be charged, in the previously explained embodiment having a diode, only the first interrupter is to be opened, preferably after equalization of the generator output voltage to the potential of the positive pole of the first energy store. In the second embodiment having two interrupters, in contrast, the second interrupter must additionally be closed. In a favorable embodiment of the method according to the invention, before the second interrupter is closed, the first interrupter is first opened and the generator output voltage is equalized to the potential at the terminal of the second energy store facing away from its reference potential. This measure is also used for no-load switching of the second interrupter, similarly to the above explanations.

The fundamental strategy of the activation of the switching device is to open the first interrupter as rarely as possible, so that the low-voltage vehicle electrical system branch essentially "sees" a typical low-voltage energy store. In a refinement of the operating method according to the invention, the first interrupter is thus essentially only opened when the charge state of the second energy store has fallen below a predetermined charge level. In addition, opening the first interrupter may also be done in recuperation operation.

As already noted, any generator having varying or variable output voltage fundamentally comes into consideration as the multi-voltage generator. Thus, for example, it is fundamentally sufficient to use a generator whose rectified output voltage has a high ripple, the controller of the switching device being adapted to the frequency of the ripple, so that in "wave valleys" only the first energy store and in "wave peaks" the series circuit made of first and second energy stores together is charged. However, using a dual-voltage generator is more favorable, which is activated together with the switching device as a function of operating parameters, i.e., in particular as a function of the charge state of the second energy store. The use of a generator having arbitrarily activatable output voltage is still more favorable, with the aid of which a capacitor circuit used as the second energy store may be charged using linear charge ramps, for example, in the scope of an especially favorable embodiment of the operating method according to the invention.

Other objects, advantages and novel features of the present invention will become apparent from the following detailed description of the invention when considered in conjunction with the accompanying drawings.

BRIEF DESCRIPTION OF THE DRAWINGS

Further features of the invention result from the following special description and the drawings. In the figures.

DETAILED DESCRIPTION OF THE DRAWINGS

Figure 1:
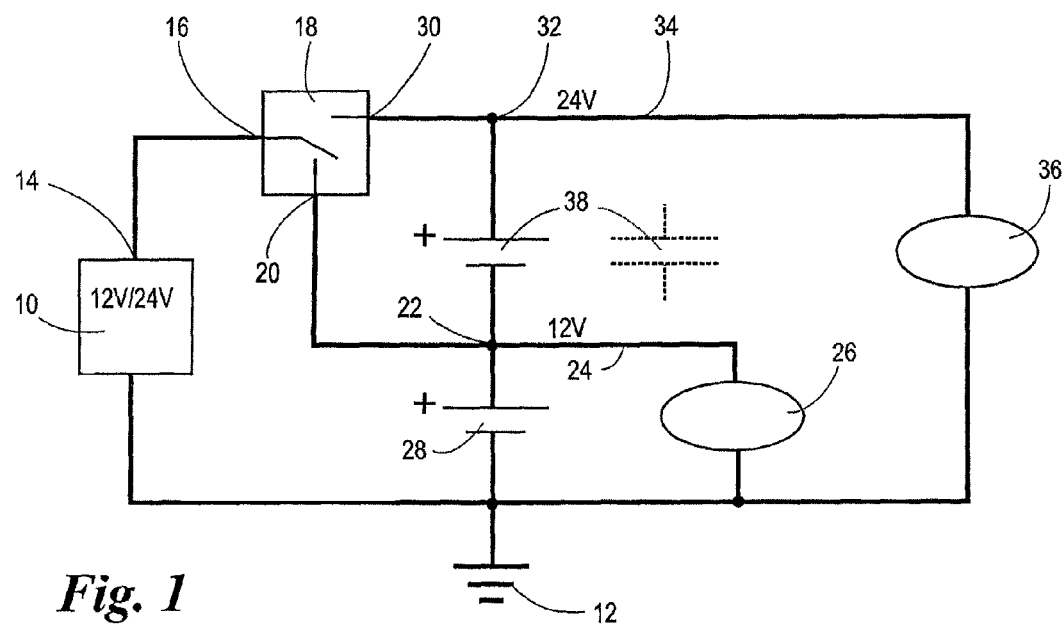
FIG. 1 shows a schematic equivalent circuit diagram of a vehicle electrical system topology according to the invention with a generalized device.

FIG. 1 shows a schematic equivalent circuit diagram of a vehicle electrical system topology according to the invention, designed for two vehicle electrical system branches having purely exemplary rated voltages of 12 and 24 V.

The generator 10 is used as the energy source of the vehicle electrical system. Fundamentally, any voltage generation device which delivers a varying or variable output voltage may be used as the generator. The term generator also includes any downstream electronics, such as power or rectifier electronics. In its simplest embodiment, the generator may be a generator typically used in motor vehicles having only one rated voltage, but a high ripple of the output voltage. However, an embodiment as a dual-voltage generator having two alternatively activatable output voltages—in the present case 12 and 24 V—is more favorable. A multi-voltage generator having continuously activatable output voltage is especially advantageous, the activatable output voltage range including 12 and 24 V in the present exemplary embodiment. In the exemplary embodiment shown, the generator is connected on one hand to a reference potential 12 (ground) and delivers a positive (possibly rippled) DC voltage at its output 14.

The output 14 of the generator 10 is connected to the input 16 of the switching device 18. The switching device 18 is shown as a "black box" in FIG. 1. Advantageous embodiments of the switching device 18 are to be explained in greater detail below in connection with FIGS. 2 and 3. The switching device 18 has a first output 20, which is connected to a node 22. The node 22 is connected on one hand to the low-voltage branch 24 of the vehicle electrical system and the consumers 26 connected thereto. The low-voltage of the low-voltage vehicle electrical system branch—in the present case 12 V—drops toward ground 12 at the consumers 26.

The node 22 is also connected to the positive pole of an energy store 28, whose negative pole is also at ground 12. In the exemplary embodiment shown, a battery is used as the energy store 28, which is designed as comparatively large at 90 Ah. The rated voltage of the low-voltage vehicle electrical system branch 24 and thus the battery 28 is 12 V in the exemplary embodiment shown.

In the case in which the switching device 18 is switched in such a manner that the generator output 14 is connected to the node 22, the consumers 26 "see" a typical 12 V vehicle electrical system. If, in this switch setting, the charge state of the battery 28 is below the output voltage of the generator 10, which is also operated at a rated output voltage of approximately 12 V in this switching state, the battery 28 is simultaneously charged again.

In its second switch setting, the input 16 of the switching device 18 is actively connected to its second output 30. The output 30 of the switching device 18 is connected to a node 32 to which the high-voltage branch 34 of the vehicle electrical system is connected. The high-voltage consumers 36 are connected in the high-voltage vehicle electrical system branch 34, via which the high-voltage—in the present case having a rated value of 24 V—drops toward ground 12.

The node 32 is also connected to the positive pole of the second energy store 38, which is not at ground at its negative pole, however, but rather is connected to the node 22, so that its voltage "starts" at the voltage of the first energy store 28. Depending on the embodiment, the second energy store 38 may be implemented as a further battery, which is designed as relatively small having approximately 55 Ah or as a capacitor circuit having high capacitance, e.g., 50-100 F (shown by dashed lines in FIG. 1), for example.

Its second switch setting, in which the input 16 is actively connected to the second output 30, the output voltage generated by the generator, which preferably approximately corresponds to the rated voltage of the high-voltage vehicle electrical system branch in this switching state, is applied via the series circuit made of first and second energy stores 28, 38. The voltage corresponding to the current charge state of the battery 28 is applied to the low-voltage consumers, while essentially the rated voltage of the high-voltage vehicle electrical system branch 34 is applied to the high-voltage consumers 36.

Figure 2:
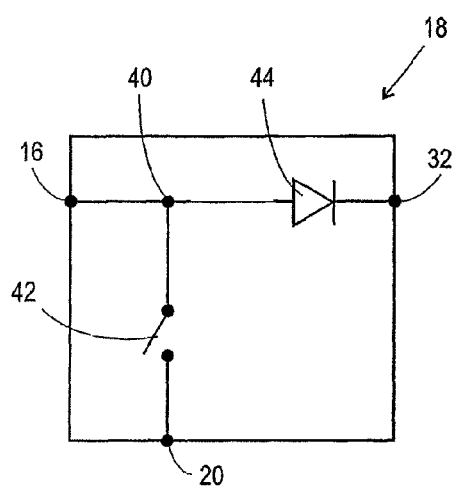
FIG. 2 shows a first embodiment of the switching device in FIG. 1.

FIG. 2 shows a first, especially simple embodiment of the switching device 18, which is to be understood as purely schematic. The input 16 is connected to the node 40, which is connected via an interrupter 42 to the first output 20. On the other hand, the node 40 is connected via a diode 44 to the second output 32. In the closed state of the interrupter 40, the output voltage of the generator 10 is applied directly via the battery 28 and the low-voltage vehicle electrical system branch 26. This is the normal state of the vehicle electrical system, which is maintained during the majority of the operating time according to the preferred operating strategy. The diode 24 prevents a current flow from flowing from the positive pole of the second energy store 38 to the node 22. In the open state of the interrupter 42, in contrast, the output voltage of the generator 10 is applied via the series circuit of first and second energy stores 28, 38 and via the high-voltage vehicle electrical system branch 34. In this state, both the first energy store 28 and also the second energy store 38 are charged. It may be seen that the switching state of the interrupter 42 and the output voltage of the generator 10 must be tuned to one another. Thus, if interrupter 42 is closed, the output voltage of the generator 10 approximately corresponds to the rated voltage of the low-voltage vehicle electrical system branch 24, while it approximately corresponds to the rated voltage of the high-voltage vehicle electrical system branch 34 if interrupter 42 is open. This is easy to implement with a dual-voltage or continuously activatable generator 10 using a suitable controller. With a simple generator having only one output rated voltage having a high ripple, in contrast, the interrupter is to be switched as a function of amplitude, it being closed at times of lower output voltage and open at times of higher output voltage.

Figure 3:
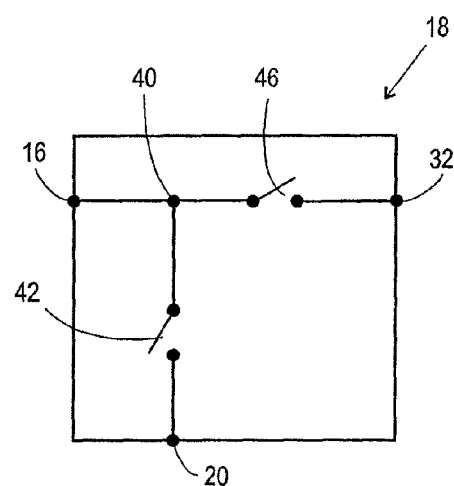
FIG. 3 shows a second embodiment of the switching device in FIG. 1.

This embodiment of the switching device 18 shown in FIG. 2 has the advantage of especially simple construction. However, the unavoidable voltage drop at the diode 44 is disadvantageous. FIG. 3 shows an alternative embodiment which overcomes this disadvantage. Instead of the diode 44, in the embodiment of FIG. 3, a second interrupter 46 is provided. This is open in the first switching state of the switching device 18, i.e., if interrupter 42 is closed, and closed in the second switching state of the switching device 18, i.e., if interrupter 42 is open. The correlation of switching state and generator output voltage essentially corresponds to that explained above in connection with FIG. 2.

To perform no-load switching of the interrupters 42, 46, which is favorable for economic reasons, upon transition from the first to the second switching state of the switching device 18, first the generator output voltage is favorably equalized to the actual voltage applied via the battery 28, which is detected by suitable sensor means (not shown). The interrupter 42 may then be opened in a no-load manner. The generator output voltage is subsequently equalized to the actual voltage of the second energy store 38, so that then the interrupter 46 may be closed in a no-load manner. In the reverse transition from the second to the first switching state of the switching device 18, in contrast, firstly the generator output voltage is equalized to the actual voltage of the second energy store 38, which is also detected by the sensor (not shown), so that the second interrupter 46 may be opened in a no-load manner. Subsequently, the generator output voltage is equalized to the actual voltage of the battery 28, so that the first interrupter 42 may then be closed in a no-load manner.

The design of the second energy store 38 as a battery or alternatively or additionally as a capacitor circuit, in particular a supercap circuit, must be performed by one skilled in the art in consideration of the concrete application and in particular the desired rated voltages. For example, if the difference between the rated voltages is only small and only a small power consumption of the high-power consumers is to be expected, a design as a capacitor circuit appears economically advisable. However, if a high energy demand of the high-power consumers 36 is to be expected and/or the difference between the rated voltages of the individual vehicle electrical system branches 24, 34 is large, the use of an additional battery as a second energy store 38 may be advisable.

Of course, the exemplary embodiments illustrated in the drawings and explained in the scope of the special description only represent exemplary embodiments of the present invention. In particular, a broad spectrum of possible variations is available to those skilled in the art in regard to the desired rated voltages of the vehicle electrical system branches 24, 34, the form of the consumers 26, 36, the concrete design of the generator 10, and the implementation of the controller of the switching device 18 in connection with the output voltage of the generator 10. It is also possible to expand the concept according to the invention by a cascading addition of further energy stores and corresponding switching devices which are connected similarly to the ideas of the invention explained in detail above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-voltage vehicle electrical system for a motor vehicle, comprising:
   at least one multi-voltage generator;
   a first energy store, whose energy is fed into a first low-voltage vehicle electrical system branch having low-voltage consumers;
   a second energy store, whose energy is fed into a second high-voltage vehicle electrical system branch having high-voltage consumers; and
   a controllable switching device, using which the energy generated by the multi-voltage generator is distributed to the first and the second vehicle electrical system branches,
   wherein the first and the second energy stores are connected in series to one another and the first vehicle electrical system branch is connected to a node between the first and the second energy stores and to a reference potential of the first energy store,
   wherein the second vehicle electrical system branch is connected in parallel to the series circuit made of first and second energy stores,
   wherein the controllable switching device being switchable between a first circuit configuration, in which the multi-voltage generator is in parallel to the first energy store and to the first vehicle electrical system branch, and a second circuit configuration, in which the multi-voltage generator is in parallel to the series circuit made of first and second energy stores and to the second vehicle electrical system branch,
   wherein the first energy store is a battery and the second energy store is a super capacitor circuit,
   wherein the controllable switching device comprises a first switchable interrupter between the terminal node of the first vehicle electrical system branch and the terminal of the multi-voltage generator facing away from its reference potential, and
   wherein the first interrupter is opened when the charge state of the second energy store has fallen below a predetermined charge level, and the second energy store is charged when the first interrupter is opened.

2. The multi-voltage vehicle electrical system according to claim 1, wherein the controllable switching device further comprises a diode, which is connected between the terminals of the multi-voltage generator and the second energy store facing away from the respective reference potentials such that if the first interrupter is closed, no current flows from the second to the first energy store.

3. The multi-voltage electrical system according to claim 1, wherein the controllable switching device further comprises a second switchable interrupter, which is connected between the terminals of the multi-voltage generator and the second energy store facing away from the respective reference potential such that if the first interrupter is closed, a current flow from the second to the first energy store is prevented by opening the second interrupter.

4. The multi-voltage vehicle electrical system according to claim 1, further comprising a third energy store, which is connected in a cascade with the first and second energy stores and the multi-voltage generator.

5. A method for operating a multi-voltage vehicle electrical system including a multi-voltage generator delivering a selectable output voltage, a first energy store and a second energy store connected in series thereto, a first low-voltage electrical system branch connected in parallel to the first energy store, and a second high-voltage vehicle electrical system branch connected in parallel to the series circuit made of first and second energy stores, and a controllable switching device, using which the multi-voltage generator may alternatively be switched parallel to the first energy store or parallel to the series circuit made of first and second energy stores, wherein the controllable switching device comprises a first switchable interrupter between a terminal node of the first vehicle electrical system branch between first and second energy stores and the terminal of the multi-voltage generator facing away from its reference potential and a unidirectional disconnection unit, between the terminals of the multi-voltage generator and the second energy store facing away from their particular reference potentials, the method comprising the acts of:
   preventing a current flow from the second to the first energy store if the first interrupter is closed; and before the first interrupter is closed, equalizing the generator output voltage to the potential of the terminals of the first energy store facing away from its reference potential, wherein the first energy store is a battery and the second energy store is a super capacitor circuit, and wherein the first interrupter is opened when the charge state of the second energy store has fallen below a predetermined charge level, and the second energy store is charged when the first interrupter is opened.

6. The method according to claim 5, wherein the disconnection unit is designed as a second switchable interrupter.

7. The method according to claim 6, wherein, before the generator output voltage is equalized, the second interrupter is opened.

8. The method according to claim 7, wherein, before the second interrupter is closed, the first interrupter is first opened and the generator output voltage is equalized to the potential at the terminals of the second energy store facing away from its reference potential.

9. The method according to claim 6, wherein before the second interrupter is closed, the first interrupter is first opened and the generator output voltage is equalized to the potential at the terminals of the second energy store facing away from its reference potential.

10. The method according to claim 9, wherein, before the first interrupter is opened, the generator output voltage is equalized to the potential at the terminal of the first energy store facing away from its reference potential.

11. The method according to claim 6, wherein the second energy store is designed as a capacitor circuit having high capacitance and the multi-voltage generator is activated after the first interrupter is opened to generate a voltage ramp for charging the capacitor circuit.

12. The method according to claim 5, wherein the first interrupter is opened in recuperation operation.

13. The method according to claim 5, wherein the second energy store is designed as a capacitor circuit having high capacitance and the multi-voltage generator is activated after the first interrupter is opened to generate a voltage ramp for charging the capacitor circuit.

* * * * *